(12) United States Patent
Hohmann et al.

(10) Patent No.: US 8,033,000 B2
(45) Date of Patent: Oct. 11, 2011

(54) METHOD FOR EFFECTING A SCREWED CONNECTION

(76) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 707 days.

(21) Appl. No.: 12/096,939

(22) PCT Filed: Dec. 8, 2006

(86) PCT No.: PCT/EP2006/011788
§ 371 (c)(1),
(2), (4) Date: Jun. 11, 2008

(87) PCT Pub. No.: WO2007/068392
PCT Pub. Date: Jun. 21, 2007

(65) Prior Publication Data
US 2008/0286069 A1    Nov. 20, 2008

(30) Foreign Application Priority Data
Dec. 13, 2005   (DE) .......................... 10 2005 059 938

(51) Int. Cl.
*B21D 39/00*    (2006.01)
(52) U.S. Cl. ................ 29/407.01; 29/407.05; 29/525.01; 29/525.02; 29/525.11; 73/761; 411/368; 411/190; 81/55
(58) Field of Classification Search ............... 29/407.02, 29/407.05, 525.01, 525.02, 525.11, 709, 29/714, 407.01, 407.08; 73/761; 81/55, 81/56; 411/368, 204, 917, 190, 132, 136, 411/138, 140, 143
See application file for complete search history.

(56) References Cited

U.S. PATENT DOCUMENTS

| | | | | |
|---|---|---|---|---|
| 110,511 A * | 12/1870 | Ratcliff | ............................. | 248/97 |
| 1,363,504 A * | 12/1920 | Flynn | ............................. | 411/140 |
| 3,541,844 A * | 11/1970 | Stover | ............................. | 73/761 |
| 4,159,483 A | 6/1979 | Bettin | | |
| 5,222,399 A | 6/1993 | Kropp | | |
| 5,888,012 A * | 3/1999 | Nygren et al. | .................. | 403/13 |
| 6,253,642 B1 | 7/2001 | Junkers | | |
| 6,490,952 B2 | 12/2002 | Junkers | | |
| 2004/0131445 A1* | 7/2004 | Kjellberg | ...................... | 411/368 |

FOREIGN PATENT DOCUMENTS

| | | |
|---|---|---|
| DE | 11 24 729 | 3/1962 |
| DE | 198 54 062 | 11/2000 |
| EP | 0 440 011 | 8/1991 |
| WO | 2004097232 | 11/2004 |

* cited by examiner

*Primary Examiner* — Jermie Cozart
(74) *Attorney, Agent, or Firm* — Gudrun E. Huckett

(57) ABSTRACT

A screwed connection has a threaded bolt; a nut; a washer arranged between the nut and a surface of a component to be clamped; a screwing device with a housing, a holding tool connected to the housing, and a tightening tool that engages positively the nut; a measuring element arranged in the washer for measuring a compressive force generated by tightening the screwed connection. The washer has an anti-rotation device oriented toward the surface of the component. The outer periphery of the washer is positive-lockingly engaged by the holding tool. The washer has no positive or frictional connection to the threaded bolt, and the holding tool has no torque supporting action on the threaded bolt or on any other part so that a reaction moment, generated when tightening the nut, is introduced from the housing of the screwing device through the washer into the component to be clamped.

7 Claims, 1 Drawing Sheet

METHOD FOR EFFECTING A SCREWED CONNECTION

BACKGROUND OF THE INVENTION

The invention concerns a screwed connection comprised of a threaded bolt, a nut, and a washer positioned between the nut and a surface of a component to be clamped.

Such screwed connections wherein the washer is engaged by a holding tool and the nut by a tightening tool are disclosed in EP 0 988 935 A2, EP 1 080 847 A2, and EP 1 435 279 A1.

According to EP 0 988 935 A2 a positive locking connection between the threaded bolt and the washer exists while according to EP 1 435 279 A1 a friction connection between the threaded bolt and the washer is provided. Additionally, according to EP 0 988 935 A2 a further holding element connected to the first holding element can positively engage the threaded bolt. In contrast to this, in the screwed connection according to EP 1 080 847 A2 there is no connection between the threaded bolt and the washer but holding tools that are connected to one another engage the washer as well as the threaded bolt in a positive locking way.

These prior art solutions have in common that the holding tool is supported on the washer as well as directly and/or indirectly on the threaded bolt to be tightened that therefore absorbs when tightening the nut the reaction forces of the screwing tool which forces are directed in a direction opposite to the tightening torque.

The frictional anti-rotation action of the washer relative to the threaded bolt according to EP 1 435 279 A1 can cause damage on the thread of the threaded bolt and thus lead to fatigue occurring too early. Moreover, the washer is designed in a special way so that its manufacture is complex.

The positive connection between the threaded bolt and the washer according to EP 0 988 935 A2 requires a matching configuration of the threaded bolt and, below the threaded part, it must be provided with one or several longitudinal grooves that are engaged by matching elements of the washer. In this way, the manufacture of the threaded bolt and of the washer is more complex and the fatigue strength of the threaded bolt may be impaired.

When in accordance with EP 0 988 935 A2 and EP 1 080 847 A2 a positive-locking engagement on the threaded bolt by means of a holding tool that, in turn, engages a holding tool engaging the washer is provided additionally, the arrangement is made more complicated and more complex.

The screw clamping force is determined in these known screwed connections by measuring the torque applied to the nut but this measurement is extremely imprecise because the frictional conditions in the screwed connection can fluctuate within a wide range as is well known in the art.

SUMMARY OF THE INVENTION

The invention has the object to provide a screwed connection that is of a simple configuration, requires only a screwing tool of a simple design, and enables a precise measurement of the screw clamping force.

Based on this object, a screwed connection comprised of a threaded bolt, a nut and a washer arranged between the nut and a surface of a component to be clamped is proposed wherein, in accordance with the present invention, the outer periphery of the washer is designed to be positively engaged by a holding tool and has a measuring element arranged therein for measuring the compressive force that is caused by tightening the screwed connection.

The invention is based on the concept that the screw clamping force acting on the threaded bolt and the force acting on the surface of the component to be clamped and transmitted by the washer are directed opposite and equal but that they act by a different radius so that the friction torque acting between the washer and the surface of the component to be clamped is greater than the friction torque acting between the thread of the threaded bolt and the nut, while the friction torque that is acting via the nut on the washer and this proportion of the reaction torque acting on the washer will cancel each other. Therefore it is sufficient to cause a holding tool that is connected to a housing of a screwing device to engage the washer in a positive locking way and to tighten the nut by means of a tightening tool of the screwing device that has been brought into positive engagement with the nut. The housing of the screwing device then remains stationary together with the washer because the reaction torque that is caused by tightening the nut is diverted from the housing through the washer into the component to be clamped without a support of the housing on the threaded bolt or on other parts being required. By means of the measuring element that is arranged in the washer the screw clamping force can be measured directly because the compressive force generated by the nut and acting on the washer is directly proportional to the screw clamping force without any friction effects occurring or having to be taken into account in this connection.

The outer periphery of the washer is of a polygon shape and has, in particular, a hexagon shape, the measuring element can be arranged so as to be recessed within one of the flat surfaces so that in this way it is protected from being damaged by the holding tool.

The measuring signals generated by the measuring element can be transmitted by a cable connection or without a cable connection inductively or by means of a radio connection to an evaluation and display device.

Preferably, the measuring element can be embodied a measuring bridge with a strain gauge or as an inductance part or as a capacitance part as a measuring part.

In order to achieve a sufficient friction torque of the washer relative to the component to be clamped from the beginning when tightening the screw, the washer can have an anti-rotation device that is acting on the surface of the component to be clamped.

This anti-rotation device can be, for example, comprised of at least one pin that is guided in a bore of the washer, wherein a pressure spring acts on one end thereof and wherein the other end is sharply pointed.

Moreover, the anti-rotation device can also be comprised of several annular segments that are arranged in grooves in the washer and are loaded by spring force.

The spring force acting on the pin or the annular segments can advantageously be increased when tightening the nut by means of at least one moveable pressure element that interacts with the nut and projects past the surface of the washer that is facing the nut.

A further simple anti-rotation device can be comprised of at least one pointed projection that upon tightening the screwed connection is forced into the surface and that is preferably comprised of a planar toothing.

The screwed connection according to the invention can be used preferably in connection with a conventional simple nut that is to be screwed onto the threaded bolt when the torsional moment is acceptable that is caused when tightening the nut on the threaded bolt and that is transmitted by thread friction. Of course, it is however also possible to use the screwed connection according to the invention for a torsion-relieved tightening of the screwed connection, for example, when according to EP 0 988 935 A2 a holding tool is brought into positive-locking connection with the threaded end of the threaded bolt or when, according to EP 1 080 847 A2, a double nut is employed wherein the inner nut is in positive-locking connection with the washer and secured by the holding tool while the outer nut is tightened by the screwing tool.

BRIEF DESCRIPTION OF THE DRAWINGS

The invention will be explained in the following with the aid of two embodiments illustrated in the drawings in more detail. The drawings show in.

DESCRIPTION OF PREFERRED EMBODIMENTS

Figure 1:
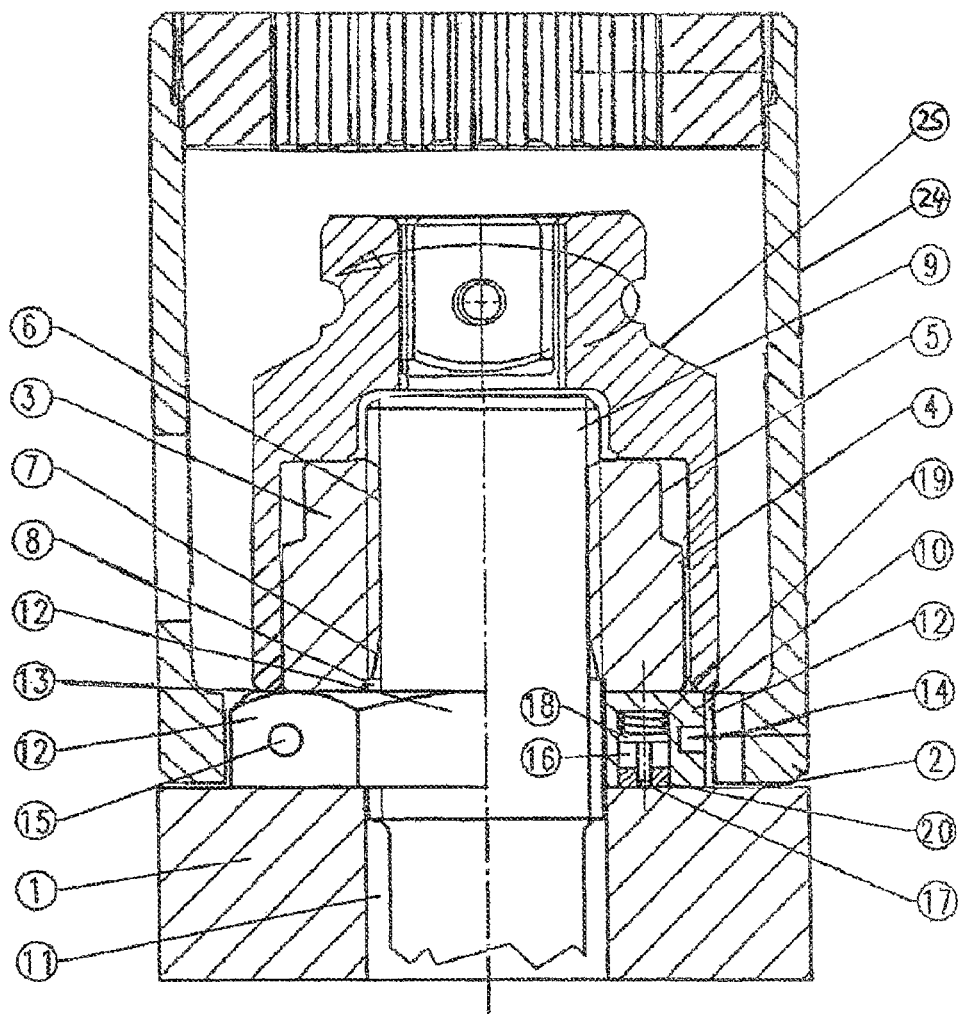
FIG. 1 a complete screwed connection with a section illustration of a first embodiment of an anti-rotation device in the washer shown, by the way, partially in an elevated view.

The component 1 to be clamped is schematically shown only a bore 11 for receiving a threaded bolt 9 and by a surface 2 against which the washer 10 is resting.

Onto the threaded end of the threaded bolt 9 a nut 3 is screwed that, in the illustrated embodiment, has a cylindrical area 4 and an area 5 with a configuration for positive-locking engagement of a nut-tightening tool 25. The nut 3 is screwed onto the threaded end 6 of the threaded bolt 9 and has on the end that is facing the washer 10 a conical recess 7 as well as a recess 8 that leaves off at least one turn of the thread, which recesses serve for distributing the force transmission onto several thread turns.

The washer 10 is also provided with configurations for positive locking engagement of a holding tool 24; in the illustrated embodiment flat surfaces 12 of an external hexagon are provided. Recessed in the area of a flat surface 12 there is a measuring element 14 by means of which the compressive force caused in the washer 10 when tightening the nut 3 can be measured. This compressive force corresponds to the screw clamping force applied onto the threaded bolt 9 that is not affected by any friction effects. The measuring signals generated by the measuring element 14 can be transmitted by an interface 15 onto an evaluation device and display device that is not illustrated. The interface 15 can be a plug connection fora cable connection to the evaluation and display device. It is likewise possible to configure the interface for inductive transmission or a radio transmission of the measured values. The interface 15 is recessed like the measuring element 14 in the flat surface 12 of the washer 10 and is connected to the measuring elements 14 in an appropriate way.

Since the average diameter of the washer 10, and thus the friction torque of the washer 10 relative to the surface 2 of the component 1 to be clam ped which friction torque is caused by the compressive force acting on the washer 10, is greater than the diameter of the thread 6, and thus greater than the friction torque that is generated in the thread 6 when tightening the nut 3, the washer 10 when tightening the nut 3 by means of a suitable screwing device remains stationary so that it is possible to attach a holding tool 24 non-rotatingly to the housing of the screwing device which holding tool 24 is brought into engagement with the outer hexagon of the washer 10 while a tightening tool 25 of the screwing device is brought into positive engagement on the nut 3. When the tightening process is triggered by means of the screwing device and the nut 3 force the washer 10 against the surface 2, the housing of the screwing device is secured against rotation relative to the washer 10 because the washer 10 absorbs the reaction moment of the housing of the screwing device that is opposite to the tightening torque and diverts it into the component to be clamped without this requiring an additional torque support on the component 1 to be clamped or on the threaded bolt 9.

In order to already absorb the reaction moment when the nut 3 is tightened only minimally against the washer 10, the washer 10 can have an anti-rotation device that is comprised, for example, according to FIG. 1, of a pointed pin 17. This pointed pin 17 is guided on the one hand in a plug 20 provided with a throughbore and on the other hand in a bore 16 in the washer 10 by means of a pressure plate 18 connected thereto and is loaded by a pressure spring 19. When positioning the washer 10 on the threaded bolt 9 in contact with the surface 2 of the component 1 to be clamped, the tip of the pin 17 will dig into the surface 2 and will effect immediately a rotational securing action that, when tightening the nut 3, is enhanced by the friction effect between the washer 10 and the surface 2 in such a way that the reaction moment of the screwing device is absorbed completely by the washer 10 and guided into the component 1 to be clamped.

Figure 2:
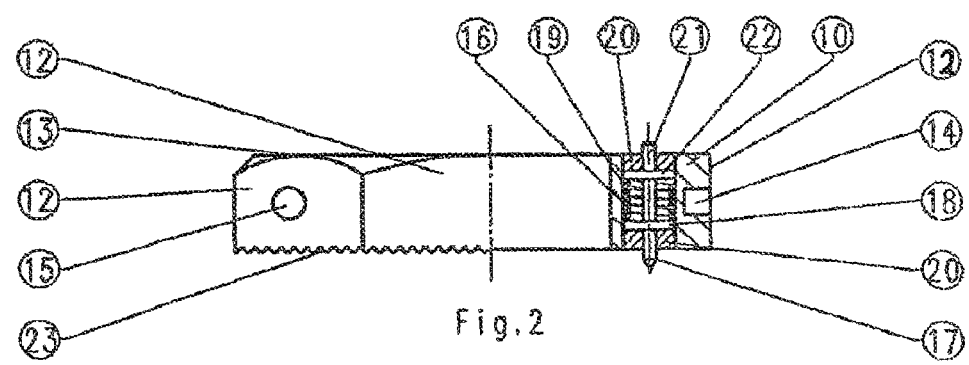
FIG. 2 two further embodiments of an anti-rotation device in the washer wherein the second embodiment is shown in section and the third embodiment is shown in an elevated view.

The embodiment illustrated on the right side of FIG. 2 corresponds with regard to the pointed pin and its guide to the embodiment illustrated in FIG. 1 but the pressure spring 19 does not act directly onto a part of the washer 10 but by means of a pressure plate 22 onto a further plug 20 by means of which a pressure element 21 in the form of a pin is guided through the surface 13 facing the nut 3. Upon tightening the nut 3 it first meets the pin 21, forces it into the bore 16 in the washer 10 and reinforces thus the pressure generated by the spring 19 onto the pointed pin 17 that in this way is forced with increased spring force into the surface 2 of the component 1 to be clamped.

These two illustrated embodiments show only one pointed pin 17 as an anti-rotation device but, of course, it is possible to arrange in the washer several such spring-loaded pins 17 about its bore.

A further simple anti-rotation device is illustrated on the left side of FIG. 2 and is comprised of a planar toothing 23 on the bottom side of the washer 10. This planar toothing 23 is forced when tightening the nut 3 into the surface 2 of the component 1 to be clamped and provides a quasi positive-locking connection between the washer 10 and the component 1 to be clamped after the nut 3 has generated the required screw clamping force.

What is claimed is:

1. A method for effecting a screwed connection, wherein the screwed connection comprises a threaded bolt; a nut; a washer that is arranged between the nut and a surface of a component to be clamped; a measuring element arranged in the washer for measuring a compressive force generated by tightening the screwed connection; and the washer having an anti-rotation device oriented toward the surface of the component; the method comprising the steps of:

positive-lockingly engaging the washer by a holding tool of a screwing device and positive-lockingly engaging the nut by a tightening tool of the screwing device comprising the holding tool and the tightening tool, the holding tool engaging an outer periphery of the washer, wherein the washer has no positive or frictional connection to the threaded bolt;

tightening the nut by the tightening tool of the screwing device, wherein the holding tool has no torque supporting action on the threaded bolt or on any other part so that a reaction moment, generated when tightening the nut by the tightening tool, is introduced from the screwing device through the washer into the component to be clamped.

2. The method according to claim 1, wherein the outer periphery of the washer has a polygon contour and is recessed for receiving the measuring element.

3. The method according to claim 2, further comprising the step of transmitting measuring signals generated by the measuring element by a cable connection or inductively or by means of a radio connection to an evaluation and display device.

4. The method according to claim 1, wherein the measuring element is embodied as a measuring bridge with strain gauges or an inductance part or a capacitance part.

5. The method according to claim 1, wherein the anti-rotation device is comprised of at least one pin guided in a bore in the washer, wherein on one end of the pin a pressure spring acts and wherein the other end is sharply pointed.

6. The method according to claim 5, wherein the spring force acting on the pin is at least partially increased when tightening the nut by means of at least one moveable pressure element that interacts with the nut and projects past the surface of the washer that is facing the nut.

7. The method according to claim 1, wherein the anti-rotation device is comprised of at least one pointed projection that upon tightening of the screwed connection is forced into the surface of the component.

* * * * *